Jan. 22, 1946.  J. F. JOY  2,393,324
AUTOMOTIVE VEHICLE
Filed Sept. 18, 1942  3 Sheets-Sheet 1
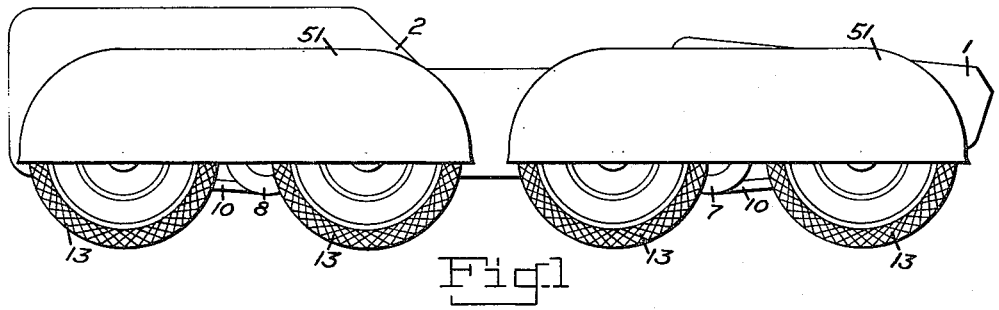
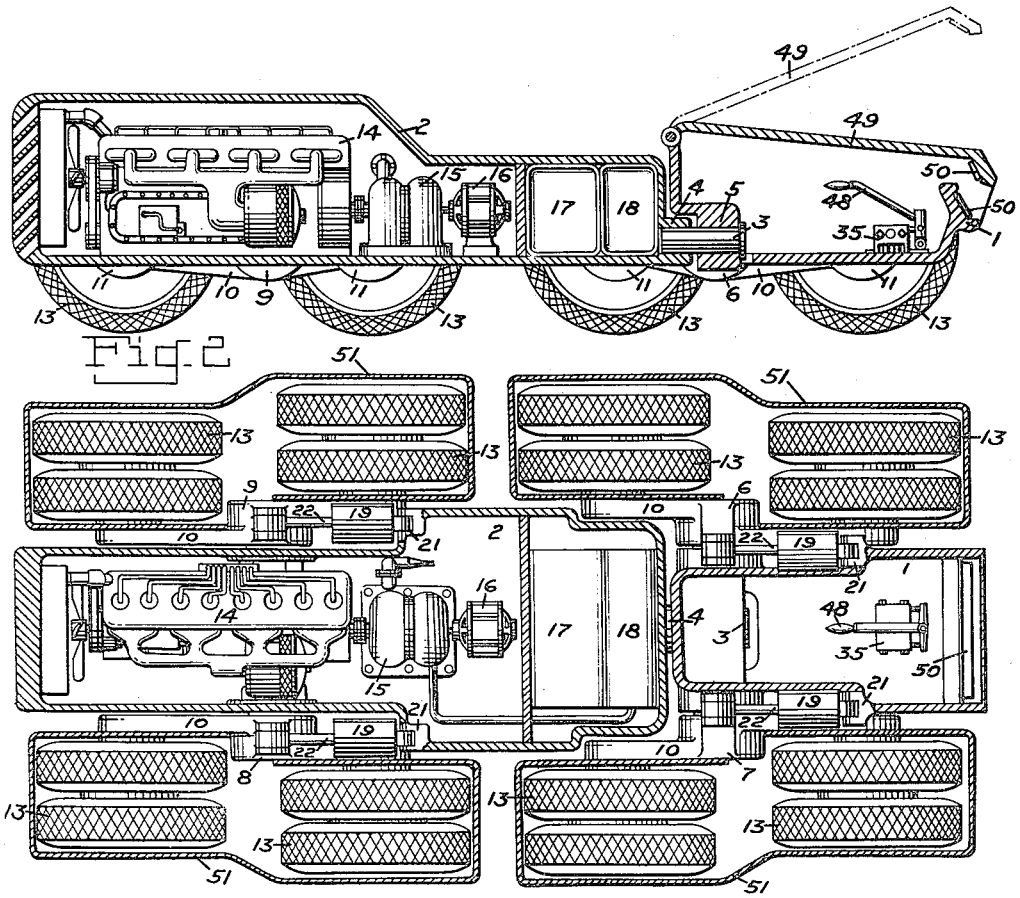

Inventor
Joseph F. Joy

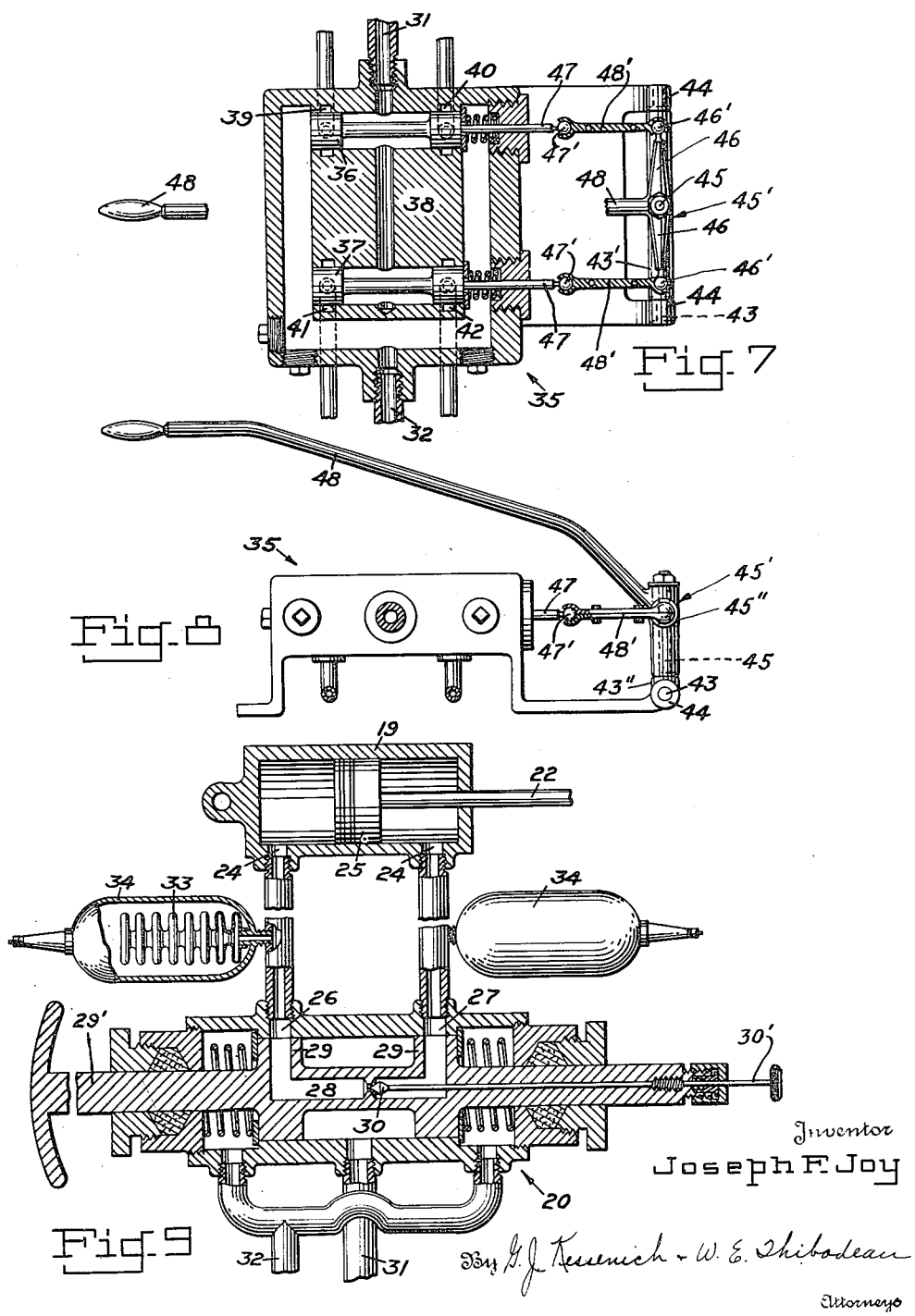

Patented Jan. 22, 1946

2,393,324

UNITED STATES PATENT OFFICE 2,393,324

AUTOMOTIVE VEHICLE

Joseph F. Joy, Claremont, N. H.

Application September 18, 1942, Serial No. 458,886

11 Claims. (Cl. 180—17)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an automotive vehicle and more particularly to a multiple wheeled vehicle adaptable as a so called "trackless" tank or general duty military vehicle and intended for efficient use on improved roads or on natural terrain.

It is an object of this invention to provide a multiple wheeled vehicle in which all wheels are driven but which does not involve the use of complicated and costly systems of gearing, differentials, and the like.

It is a further object to provide for greatly simplified control of such a vehicle and to provide a construction which allows any damaged driving unit to be segregated without seriously affecting the performance of the vehicle as a whole.

Another object is the provision of a vehicle wheel suspension which provides for maximum body stability during operation on rough terrain.

The exact nature of the invention as well as other objects and advantages thereof will clearly appear from a description of a preferred embodiment as shown in the accompanying drawings in which:

Figure 1 is a side elevational view of a vehicle constructed according to my invention adapted to use as a mobile gun mount.

Figure 2 is a longitudinal section view through a vehicle of the type shown in Fig. 1.

Figure 3 is a top plan view partially in section of my novel vehicle.

Figure 7 is a horizontal sectional view through the main control valve.

Figure 8 is a side elevational view of the control valve shown in Fig. 7.

Figure 9 is a horizontal sectional view through one of the buffer control valves, the connection to the buffer being indicated schematically.

Figure 4:
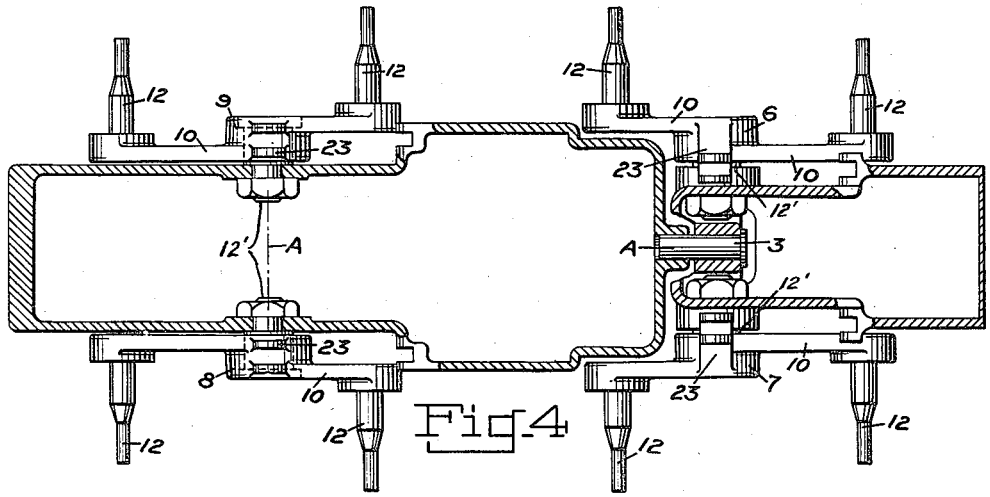
Figure 4 is a top plan view of the chassis showing the suspension system in more detail the shock absorbers being omitted in this view.

Referring to the drawings by characters of reference it will be seen that the vehicle which is the subject of this invention comprises a front chassis until 1 and a rear chassis unit 2. These chassis units are joined to each other by a hollow pivot shaft 3 journaled in bearings 4 and 5 on the chassis units. Lateral trunnions 6 and 7 are provided on each side of the front chassis unit and similar trunnions 8 and 9 are provided on the sides of the rear chassis unit. Each chassis unit is thus provided with the equivalent of three point suspension. Uuon each of the trunnions is pivoted a rocker bar 10 having means near each end thereof to accommodate the shaft of a wheel motor 11 of a type similar to those shown in my copending applications, Serial No. 426,730 filed January 14, 1942, or Serial No. 438,061 filed April 8, 1942, the latter having been issued as Letters Patent Number 2,353,730, July 18, 1944. These motors 11 comprise shafts 12 adapted to be secured in nonrotating relation to a vehicle element, in this case the ends of the rocker bars 10, and hydraulic motors rotatable on the shafts and carrying pneumatic tires 13 on their circumference. Thus it will be seen that each chassis unit is provided with four driven wheels and that with the exception of the slightly off center location of the trunnion bearings on the rocker bars the load will be approximately equally divided between the wheels regardless of the roughness of the terrain. Steering is readily accomplished by varying the speeds of the wheel motors as will be described in more detail later.

Each chassis unit consists of a boxlike body which may be heavily armored, the armor conveniently bearing a large proportion of the structural stresses. The forward unit comprises an operator's cab with the necessary control equipment and the rear unit includes a deck upon which a pedestal gun mount may be secured and contains a Diesel motor 14 or other prime mover directly coupled to one or more hydraulic pumps 15 which may be similar to that disclosed in my copending application Serial No. 426,729, filed January 14, 1942. Generators 16 and other auxiliary equipment as well as tanks for fuel 17 and a reserve supply of hydraulic fluid 18 are also housed therein. Fluid connections from the pump to the operator's cab preferably pass through the hollow pivot shaft 3 connecting the chassis units while flexible conduits to each wheel motor are carried through the sides of the body at locations as near the trunnion axis as convenient. Obviously these conduits could be brought through the rocker bar itself and then through the trunnion shaft but it is believed that to do so would complicate the manufacture beyond the benefit which might be gained thereby for ordinary service. The type of service to be faced should be the deciding factor, as obviously if the particular vehicle was to be used in front line service and was faced with the likelihood of heavy fire relatively exposed conduits would be a decided disadvantage.

Figure 4 shows the suspension system in more detail with particular relation to the load distribution. The loads on each chassis unit due to the vehicle itself and to a gun on the deck or other pay load are preferably so proportioned that approximately 50% of the loading can be considered to be concentrated at each of the points marked A. These loads must be sustained by the lateral trunnions and hence each of such trunnions must sustain substantially 25% of the total load which may be considered concentrated on the pivot axles 12'. The load carried by each of the lateral trunnions must be divided between the two wheels supported at the ends of the rocker bars. As all the axles are stiff and it is contemplated that steering be accomplished by speed regulation of the wheels on opposite sides it has been felt desirable that the end wheels carry about 10% of the total load as opposed to 15% carried by those wheels nearer the center of the vehicle. Accordingly, the end wheels are given the longer lever arm on the rocker bar. The end wheels are thus caused to yield to the turning force of the inner wheels permitting a shorter turning radius than would be possible if the weight were distributed equally. The steering of this vehicle will be seen to be similar to that employed with tracklaying type vehicles in that a certain sidewise slippage of the driving units is required. The unequal loading will also facilitate climbing over obstacles in the path of the wheels. The vehicle is not however limited to making turns of a long radius or to making shorter turns at the expense of wheel slippage as it is contemplated that the shock absorbing cylinders may be so utilized as to lift the end wheels clear of the roadway permitting the vehicle to pivot without material slippage. With the end wheels raised the vehicle may be more efficiently operated on improved roads thus increasing tire life and promoting efficiency generally.

Figure 5:
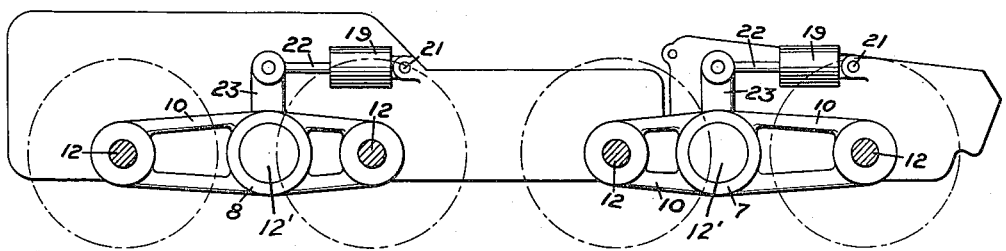
Figure 5 is a side elevational view of the chassis shown in Fig. 4.

The shock absorber cylinders above referred to are indicated generally on the drawings by the reference numeral 19 and one of the cylinders is shown somewhat schematically in connection with its control valve 20 in Fig. 9. As shown in Fig. 5 each shock absorber 19 comprises a cylindrical body swingably secured to the chassis unit as at 21 and having a piston rod 22 secured to an arm 23 disposed generally at a right angle to the rocker bar 10. Each shock absorber unit is seen to be a conventional hydraulic cylinder having ports 24 at each side of the piston 25. These ports are, as shown in Fig. 9, connected to end ports 26 and 27 of the control valve 20. The control valve 20 is in most respects the same as conventional balanced piston hydraulic reversing valves, differing therefrom in that in neutral position a bypass 28 is provided through the piston 29 between the ports 26 and 27. This bypass is preferably provided with an adjusting valve 30 adapted to be operated by the handle 30' and capable of closing the orifice completely or of regulating the resistance to flow therethrough. The effect of this restricted bypass in normal use of the vehicle will be to prevent sudden wheel movement in passing over rough terrain and will have the effect of smoothing movement of the car body. When the valve 30 is in closed position it will be seen that operation of the piston 29 of valve 20 by the operating handle 29' will have the effect of directing fluid from the high pressure line 31 to one side or the other of piston 25 producing movement thereof and lifting the corresponding wheel clear of the ground. Returning the piston 29 of valve 20 to neutral position locks the corresponding wheel is raised position. It will be seen that a damaged wheel unit may thus be raised out of the way permitting the vehicle to proceed without seriously affecting efficiency since an excess of power has been provided in each unit with that contingency in mind. Riding qualities may be further improved by providing an expansible bellows 33 in communication with each fluid line to the cylinder, the bellows being enclosed in a chamber 34 and restrained by pressure of air or other gas surrounding it. These air springs will provide sufficient springing to allow the vehicle to run comfortably with one end of the rocker raised.

Figures 7 and 8 show the main control valve 35. It is the function of this valve to take fluid from the main pressure line 31 and after it has passed through the wheel motors to allow it to return to the reservoir 18 through the return conduit 32. This valve is so arranged that in response to the will of the operator fluid may be directed to the motors in such a way that all motors may be simultaneously driven in either forward or reverse direction, the motors on either side driven in one direction while those on the other side are driven in the opposite direction, or the motors may be locked at rest. Between these extremes are presented a practically infinite variety of combinations of power application all responsive to universal movement of a single control handle not unlike the "joystick" employed on aircraft. The control valve comprises a pair of balanced piston valves 36 and 37. These valves are preferably housed in a common casing 38 which provides a connection from the main pressure conduit 31 to the space between the pistons of each valve and likewise provides for placing the space at the outer ends of each of the pistons in communication with the return conduit 32. A pair of ports 39 and 40 are provided in opposition to the pistons of the valve 36 and communicate with the wheel motors on the left side of the vehicle through suitable piping. A similar pair of ports 41 and 42 in opposition to the pistons of the valve 37 communicate with the wheel motors on the right side of the vehicle. It will be obvious that displacement of either valve from the neutral position in which it is shown will direct fluid to the wheel motors in such a direction as to tend to drive the vehicle in a direction corresponding to the motion of the valve. For example if both pistons are drawn forwardly as far as possible all of the wheel motors will drive forward at full speed.

A horizontal shaft 43 is journalled in bearings 44 carried by the base of the valve housing 38. A sleeve 43' is journalled on the shaft 43, and is provided with an upstanding portion 43'', here shown as located midway of the ends of the sleeve 43'. The portion 43'' carries a vertical shaft 45 extending at right angles to the horizontal shaft 43. A steering member 45' is provided for controlling movement of the vehicle, and as here shown, comprises a sleeve 45'' journalled on the shaft 45, this sleeve being formed with oppositely extending arms 46, each arm terminating in the ball end of a ball joint 46'. A rod 47 extends from each of the piston valves 36 and 37, and each of these rods 47 terminates in the ball end of a ball joint 47'. Interconnecting each of the arms 46 with respective ones of the rods 47 is a link 48' having at each end the socket parts of the ball joints 46' and 47'. As herein shown, a control handle 48 is formed integral with the sleeve 45" and extends therefrom into position to be reached by the driver. It can be seen that raising the control handle will draw both valve pistons forward and pass fluid to the motors to move the vehicle forward, while lowering the handle will reverse the motors. Similarly moving the handle to one side or the other will vary the amount of fluid passed to the motors on opposite sides and in the extreme case will reverse the motors on one side while those on the other side run ahead. When the control valve is returned to neutral position no fluid will flow to the motors, and since the wheel motors employed are of the positive displacement type, it will be obvious that the wheels will be locked at rest. Universal movement of the control valve handle, therefore provides complete control over braking and steering, as well as of the speed and direction of rotation of the motors.

Figure 6:
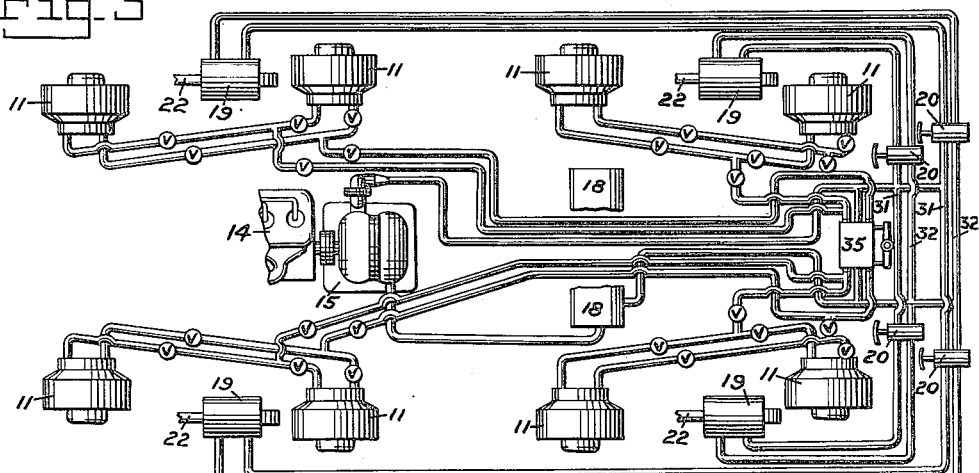
Figure 6 is a piping layout showing schematically the fluid circuits involved.

Figure 6 shows in schematic form the layout of piping necessary to accomplish the functions described. It will be noted that individual valves are provided by which any driving unit or group of units may be segregated to prevent loss of oil in case of damage to any wheel motor or fluid conduit leading thereto. In this manner the mobility of the vehicle will not be destroyed as long as a driving unit remains in operation on each side of the vehicle and at least one wheel on a side of each of the two chassis units remains capable of sustaining a load. This offers an important advantage in comparison with tracklaying vehicles which are often totally immobilized by one direct hit on a track or in the final drive unit.

As shown in the drawings the vehicle is particularly adapted for use as a self propelled gun carriage and in furtherance of that purpose the operator's cab has been provided with a door 49 which may be lowered into position to protect the driver under combat conditions without obstructing all around traverse of a gun mounted on the deck of the rear chassis unit. Vision mirrors 50 have been provided to allow the driver to see his way and the simplified control system employed permits the vehicle to be operated from a semi-reclining position. For normal travelling the cab door would be raised to the position indicated in dotted lines and the operator would sit erect. In order to secure maximum protection to the tires and wheels without interfering with the flexibility of suspension armored wheel guards 51 have been secured to each rocker bar in position to enclose each wheel unit as far as possible.

In summarizing it may be seen that the following advantages may be realized with a vehicle of this construction:

1. A Diesel motor can be used without sacrificing any of the efficiency of that type of motor as the hydraulic pump employed is designed to be operated at constant speed regardless of load.

2. The mobility of a vehicle of this type is expected to be as great on any type of terrain as that of a tracklaying vehicle and the efficiency of my improved vehicle should be considerably greater on improved roads. Further this mobility may be maintained in spite of damage or complete destruction of several wheel motors. The lack of gearing permits of maximum center clearances while the suspension system employed guarantees a high degree of body stability.

3. Maintenance of the new vehicle should be much simpler than that of any existing vehicles. The wheel motors are interchangeable and each is conveniently accessible for inspection or repair, while means have been provided to lift the driving units to allow their complete replacement under field conditions. Since there are no drive shafts or other mechanical interconnections in the power transmission system twisting or misalignment of the frames will not result in disabling the vehicle.

4. A vehicle of this type is unexcelled for convenience of operation since car operations including acceleration, deceleration, steering and braking are all accomplished by movement of a single control handle.

5. A vehicle of the type herein described may be utilized to advantage in almost every field of military and civilian endeavor. All vulnerable parts concerned in the operation of the vehicle are concentrated in a boxlike body of low silhouette which may be conveniently provided with protective armor. The use of hydraulic power as a driving medium makes the same conveniently available for use in the power operation of artillery weapons training mechanism.

I claim:

1. An automotive vehicle comprising a forward chassis unit, a rear chassis unit, connecting means between said chassis units permitting them to turn with relation to each other about a longitudinal axis, a pair of rocker bars on each chassis unit mounted with capacity to pivot about a transverse axis passing through the chassis unit, a hydraulic wheel motor mounted on each end of each rocker bar, a prime mover in said rear chassis unit, a hydraulic pump in said rear chassis unit coupled to said prime mover to be driven thereby, a unitary control valve in said forward chassis unit, and fluid conduit means connecting said pump through said valve to each of said motors.

2. An automotive vehicle comprising a forward chassis unit, a rear chassis unit, connecting means joining said chassis units and permitting relative rotation about a longitudinal axis, laterally extending pivot axles on each side of each chassis unit, a rocker bar journaled between its ends on each of said pivot axles, a hydraulic wheel motor and wheel mounted on each end of each rocker bar, and means in said chassis units to supply hydraulic fluid to said motors.

3. An automotive vehicle as described in claim 2, the lengths of the arms of said rocker bars being so chosen that a preponderance of weight will be borne by the rear pair of wheels on the front chassis unit and by the front pair of wheels on the rear chassis unit.

4. An automotive vehicle as described in claim 2, an offset arm on each of said rocker bars, a hydraulic cylinder secured between said arm and the chassis unit on which said rocker bar is mounted, and valve means arranged to permit restricted flow in said cylinder to allow the same to act as a shock absorber or to selectively direct the flow to said cylinder to cause the same to lift a selected end of said rocker bar.

5. An automotive vehicle comprising a body, lateral pivot axles on opposite sides of said body, a rocker bar journaled between the ends thereof on each axle, wheel motors mounted on the ends of said rocker bars, a double acting hydraulic cylinder connected between a portion of each rocker bar offset from said pivot axle and the body of said vehicle, connections permitting restricted flow between the opposed ends of said cylinders, means to stop said restricted flow, and means to supply additional fluid to a desired end of said double acting cylinder whereby said rocker bar may be caused to assume a desired angular position in relation to said body.

6. In a vehicle comprising a body, lateral pivot axles on said body, and wheel mounting rocker bars journaled on said axles, combined shock absorber and lift means comprising double acting hydraulic cylinders operatively engaged between said body and a portion of each rocker bar offset from said pivot axle, a fluid line extending from each end of said cylinder, a control valve providing a restricted communication between the ends of said cylinder, means to stop the communication between the cylinder ends, and means associated with said control valve to supply fluid through said valve to a desired end of said cylinder for lifting an end of said rocker bar.

7. Shock absorber and lift means as described in claim 6, an expansible bellows member in communication with each fluid line extending from an end of said hydraulic cylinder, and a rigid casing surrounding said expansible bellows, said casing containing a compressed gaseous medium.

8. Control means for a vehicle including a hydraulic pump and a plurality of hydraulic wheel motor means located on opposite sides of said vehicle and having interconnected fluid connections with said hydraulic pump, said control means comprising two reversible valves, one controlling fluid passage to the motor means on one side of said vehicle, and the other controlling fluid passage to the motor means on the opposite side of said vehicle; and operating means for said valves, comprising a pivoted member movable about a predetermined axis, said pivoted member carrying a shaft the axis of which is disposed transversely to said predetermined axis, and a single handle having a portion in bearing relation about said shaft and having also oppositely disposed arms each so connected to a respective one of said valves whereby movement of said handle to shift said operating means about said predetermined axis causes simultaneous movement of said valves in the same direction, so that flow of fluid to said wheel motors on both sides of said vehicle is increased or decreased, depending upon direction of shifting, and movement of said handle to shift to said arms about the axis of said shaft causes relative movement of said valves in opposite directions, so as to increase flow of fluid to the hydraulic wheel motor means on one side of said vehicle and simultaneously decrease flow of fluid to the hydraulic wheel motor means on the opposite side of said vehicle.

9. Control means for a vehicle including a hydraulic pump and a plurality of hydraulic wheel motor means located on opposite sides of said vehicle and having fluid connections with said hydraulic pump, said control means comprising two reversible valves, one controlling fluid passage to the motor means on one side of said vehicle, and the other controlling fluid passage to the motor means on the opposite side of said vehicle; and operating means for said valves comprising a single handle pivoted about axes which are disposed transversely with respect to each other, said handle having a pair of arms disposed on opposite sides of one of said axes and on the same side of the other of said axes and swingable with said handle about either or both of said axes, each of said arms having connection with a respective one of said valves, the construction being such that movement of said handle about one of said axes causes rotary movement of said arms about said one axis and movement of said handle about the other of said axes causes bodily shifting of said arms without rotation about said other axis, the connections of said arms with said valves being so constructed and arranged that rotary movement of said arms causes movement of said valves in opposite directions so as to increase flow of fluid to the hydraulic wheel motor means on one side of said vehicle and simultaneously decrease flow of fluid to the hydraulic wheel motor means on the opposite side of said vehicle, and bodily swinging movement of said arms causes simultaneous movement of said valves in the same direction, so that flow of fluid to said hydraulic wheel motor means on both sides of said vehicle is increased or decreased depending upon direction of shifting of said handle about said other axis.

10. A vehicle, comprising: a prime mover, a hydraulic pump driven by said prime mover; wheels on opposite sides of said vehicle; an independent hydraulic wheel motor means for each of said wheels; two reversible valves, having connection with said hydraulic pump; one valve controlling fluid passage to the wheel motor means on one side of said vehicle, and the other controlling fluid passage to the wheel motor means on the opposite side of said vehicle; and operating means for said valves comprising a single handle pivoted about axes which are disposed transversely with respect to each other, said handle having a pair of arms disposed on opposite sides of one of said axes and on the same side of the other of said axes and swingable with said handle about either or both of said axes, each of said arms having connection with a respective one of said valves the construction being such that movement of said handle about one of said axes causes rotary movement of said arms about said one axis and movement of said handle about the other of said axes causes bodily shifting of said arms without rotation about said other axis, the connections of said arms with said valves being so constructed and arranged that rotary movement of said arms causes movement of said valves in opposite directions so as to increase flow of fluid to the hydraulic wheel motor means on one side of said vehicle and simultaneously decrease flow of fluid to the hydraulic wheel motor means on the opposite side of said vehicle, and bodily swinging movement of said arms causes simultaneous movement of said valves in the same direction, so that flow of fluid to said hydraulic wheel motor means on both sides of said vehicle is increased or decreased depending upon direction of shifting of said handle about said other axis.

11. Control means for a vehicle including a hydraulic pump and a plurality of hydraulic wheel motor means located on opposite sides of said vehicle and having fluid connections with said hydraulic pump, said control means comprising two reversible valves, one controlling fluid passage to the motor means on one side of said vehicle, and the other controlling fluid passage to the motor means on the opposite side of said vehicle; and operating means for said valve comprising a single handle pivoted about axes which are disposed transversely with respect to each other, said handle having a pair of arms disposed on opposite sides of one of said axes and on the same side of the other of said axes and swingable with said handle means about both of said axes, each of said arms having connection with a respective one of said valves, the construction being such that movement of said handle about one of said axes causes rotary movement of said arms about said one axis and movement of said handle about the other of said axes causes bodily shifting of said arms without rotation about said other axis, the connections of said arms with said valves being so constructed and arranged that rotary movement of said arms causes movement of said valves in opposite directions so as to increase flow of fluid to the hydraulic wheel motor means on one side of said vehicle and simultaneously decrease flow of fluid to the hydraulic wheel motor means on the opposite side of said vehicle, and bodily swinging movement of said arms causes simultaneous movement of said valves in the same direction, so that flow of fluid to said hydraulic wheel motor means on both sides of said vehicle is increased or decreased depending upon direction of shifting of said handle about said other axis; and independent valve means for each of said wheel motor means, each so constructed and arranged as to block fluid flow to its respective wheel motor means without interfering with operation of said hydraulic pump or any of the other of said hydraulic wheel motor means.

JOSEPH F. JOY.

Certificate of Correction

Patent No. 2,393,324. January 22, 1946.

JOSEPH F. JOY

It is hereby certified that errors appear in the printed specification of the above numbered patent requiring correction as follows: Page 1, first column, line 53, for "until 1" read *unit 1*; and second column, line 6, for "Uuon" read *Upon*; page 2, second column, line 6, for the words "is raised" read *in raised*; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*